Aug. 4, 1925.　　　　　　　　　　　　　　　　　1,548,104
H. G. SLINGLUFF
METHOD OF INTERRUPTING LONGITUDINAL CRACKS IN GLASS SHEET DRAWING
Filed Feb. 26, 1923
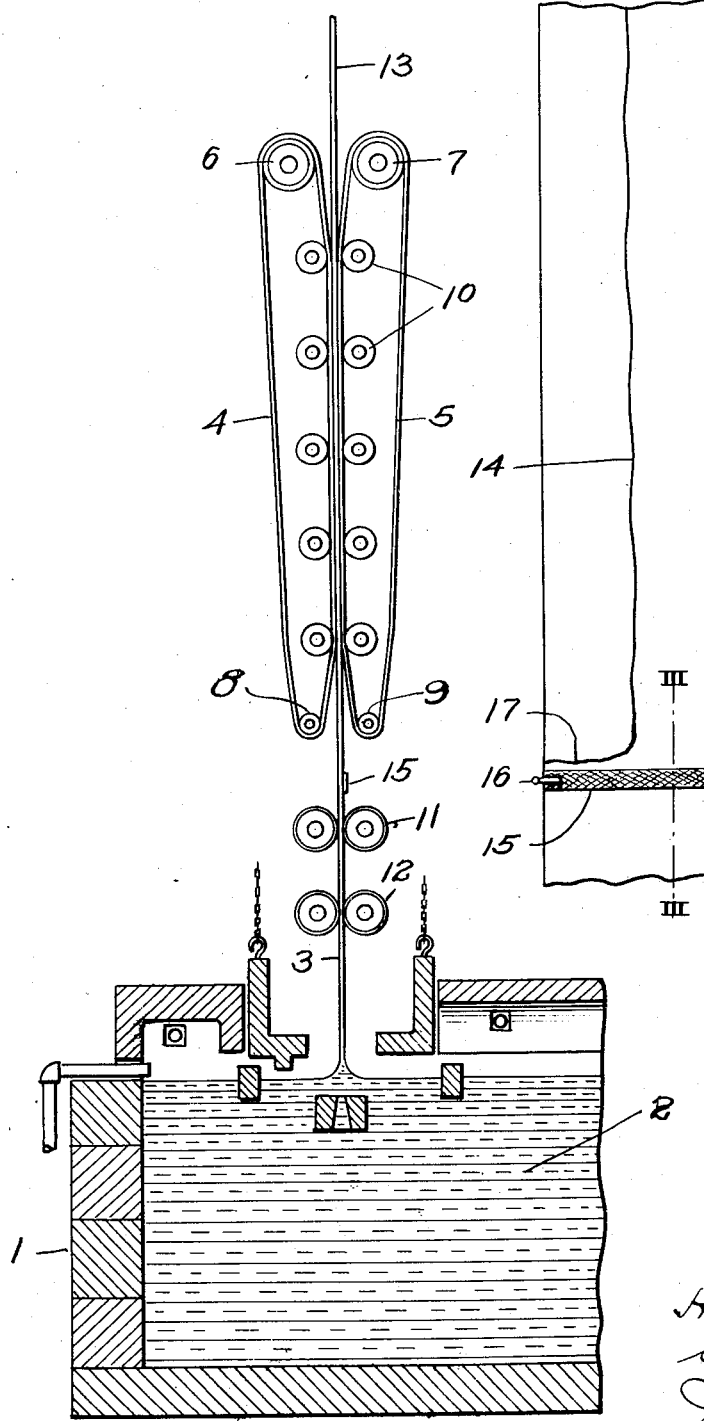
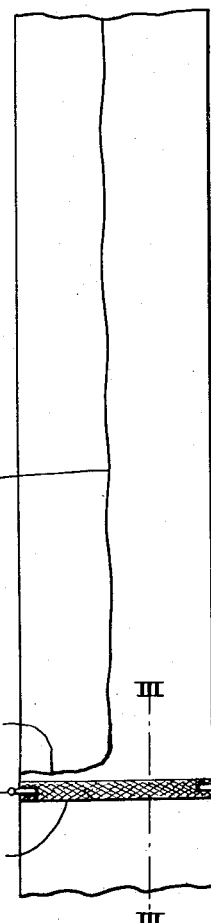
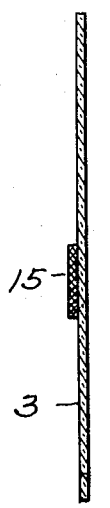
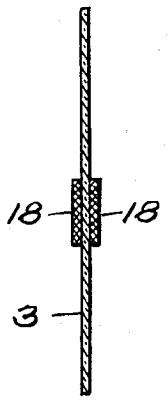
INVENTOR
H. G. Slingluff.
by
James C. Bradley
atty Patented Aug. 4, 1925.

1,548,104

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

METHOD OF INTERRUPTING LONGITUDINAL CRACKS IN GLASS-SHEET DRAWING.

Application filed February 26, 1923. Serial No. 621,185.

*To all whom it may concern:*

Be it known that I, HARRY G. SLINGLUFF, a citizen of the United States, and a resident of Mount Vernon, in the county of Knox and State of Ohio, have made a new and useful invention in Improvements in Methods of Interrupting Longitudinal Cracks in Glass-Sheet Drawing, of which the following is a specification.

The invention relates to a method of interrupting the longitudinal cracks which sometimes develop in a sheet drawing operation, such as that shown in my Patent No. 1,364,895, and illustrated diagrammatically in Fig. 1 of the accompanying drawings. In this operation the glass sheet is drawn vertically through a pair of endless belts, and the invention has a special supplemental advantage when applied in connection with such an apparatus as hereinafter pointed out, but the method also has utility in other sheet forming systems where the glass is drawn by other apparatus and in directions other than a vertical one, and it will be understood that the invention in its broad form is not limited to use in any particular drawing system. In any continuous drawing system cracks are liable to develop longitudinally of the sheet and continue indefinitely, thus decreasing the value of the product. In the vertical drawing system illustrated, the glass is cut into sections or lengths as it emerges from the drawing belts, and the cutting off operation will sometimes start a vertical crack which will continue through a considerable distance unless means are employed to stop the crack by turning it laterally so that it runs out through the side of the sheet.

I have found that this result can readily be accomplished by the procedure as hereinafter described in connection with the accompanying drawings wherein:

Figure 1 is a side elevation partially in section showing diagrammatically one form of drawing apparatus in connection with which the invention may be employed. Fig. 2 is a diagrammatic view showing the sheet of glass. Fig. 3 is a vertical section on the line III—III of Fig. 2. And Fig. 4 is a section corresponding to that of Fig. 3 but involving a modification which consists in applying two strips of fabric to the glass instead of a single strip.

Referring to the drawings, 1 is a drawing tank connected with a suitable melting tank and carrying a bath of glass 2 from which a sheet of glass 3 is being continuously drawn. As here illustrated, the drawing is effected by a pair of endless belts 4 and 5 of asbestos fabric passing around the driven rolls 6 and 7 at their upper ends and carrying at their lower ends the circular bars 8 and 9 which serve to apply tension to the belts by reason of their weight. Pressure is applied to the inner flights of the belts to cause them to grip the glass sheets therebetween by means of a plurality of rollers 10 yieldingly held against the back of the sheet by weights or other suitable means such as those shown in my copending application Serial No. 621,184. Between the drawing belts and the glass bath are two pairs of driven rolls 11 and 12 preferably covered with asbestos and yieldingly held in contact with the glass sheet to supplement the drawing action of the belts.

The glass is cut into sections as it emerges from the belts at the point 13 by any suitable means. In case a vertical crack develops in the sheet 3 as indicated at 14 in Fig. 2, such crack will continue downward through the sheet for very considerable distance unless some means is provided for stopping it by turning it laterally to the edge of the sheet. In accordance with the present invention, this is accomplished by stretching across the sheet below the belts a strip of asbestos fabric 15, which strip is secured in position at the edges of the sheet by means of a pair of wood clamps 16 similar to clothes pins, although preferably thinner, so that they may readily pass upward between the belts without being disengaged. The presence of this strip effects the temperature of the glass sheet lying beneath so that the crack 14 instead of continuing downward turns laterally as indicated at 17 and runs out through the edge of the sheet. In this manner the vertical crack is stopped and that portion of the sheet below the strip of fabric emerges from the belts in unbroken condition.

As above indicated, the strip of fabric is permitted to pass upward with the glass through the rolls and performs a useful function aside from checking the cracking action since it serves to catch small fragments or splinters of glass which may have been broken out along the crack 14 and carries them out at the top of the belts. These fragments of broken glass, if allowed to pass downward into the bath would be picked up by the glass sheet to which they would adhere or weld and mar the surface and tend to cause breakage. This pick up effect is further improved by placing a strip of asbestos 18 on each side of the sheet as indicated in Fig. 4, such strips both being clamped to the glass sheet by the wood pins 16.

The invention is not limited to the use of the flexible asbestos fabric as other material might perform this same function, although asbestos fabric is the best and most available material with which I am familiar for this purpose. It is desirable that the material should be flexible so as to fit against the surface of the sheet and also that it should be more or less refractory in order to resist the high temperatures involved until the function of turning the crack laterally is accomplished. The invention also contemplates the use of a band of material in the form of a coating which should be more or less refractory and non-conducting in order to secure the same function of modifying the temperature of the strip of glass beneath the coating, which in my opinion is the cause of the turning aside of the crack.

What I claim is:

1. The method of stopping a progressive longitudinal crack in a continuously drawn sheet of glass which consists in applying transversely of the sheet in advance of the crack a strip of fabric.

2. The method of stopping a progressive longitudinal crack in a continuously drawn sheet of glass, which consists in applying transversely of the sheet in advance of the crack a strip of flexible refractory material.

3. The method of stopping a progressive longitudinal crack in a continuously drawn sheet of glass, which consists in applying transversely of the sheet in advance of the crack a strip of asbestos.

4. The method of stopping a progressive longitudinal crack in a continuously drawn sheet of glass, which consists in applying transversely of the sheet in advance of the crack, a layer of material contacting with the sheet and affecting its temperature along the line of contact so that the crack is turned laterally to the edge of the sheet.

5. The method of stopping a progressive longitudinal crack in a continuously drawn sheet of glass, which consists in applying transversely of the sheet in advance of the crack a layer of relatively refractory non-conducting material.

6. The method of stopping a longitudinal crack in a sheet of glass drawn continuously from a bath of molten glass through a pair of vertical endless belts, which consists in securing to the sheet below the belts a strip of flexible refractory material extending transversely of the sheet, and permitting such strip to be carried through the belts by the glass sheet.

In testimony whereof, I have hereunto subscribed my name this 29th day of Jan'y, 1923.

HARRY G. SLINGLUFF.